United States Patent [19]

Dang

[11] Patent Number: 5,777,976
[45] Date of Patent: Jul. 7, 1998

[54] HOLOGRAPHIC ELEMENT DIFFRACTING A REFLECTED LIGHT BEAM ONTO A SINGLE LIGHT SPOT OF A DETECTOR

[75] Inventor: Lieu Kim Dang, Villingen-Schwenningen, Germany

[73] Assignee: Deutsche Thomson-Brandt GmbH, Villingen-Schwenningen, Germany

[21] Appl. No.: 662,626

[22] Filed: Jun. 13, 1996

[30] Foreign Application Priority Data

Aug. 22, 1995 [DE] Germany ............ 195 30 740.2

[51] Int. Cl.$^6$ ............................................. G11B 7/00
[52] U.S. Cl. ............................................. 369/103; 369/109
[58] Field of Search ............................ 369/103, 109, 369/112, 118, 107, 44.11

[56] References Cited

U.S. PATENT DOCUMENTS

| | | | |
|---|---|---|---|
| 4,924,079 | 5/1990 | Opheij et al. | 369/44.11 |
| 4,945,529 | 7/1990 | Ono et al. | 369/109 |
| 5,231,620 | 7/1993 | Ohuchida | 369/44.14 |
| 5,553,050 | 9/1996 | Yang | 369/103 |
| 5,583,843 | 12/1996 | Horinouchi | 369/103 |
| 5,648,951 | 7/1997 | Kato et al. | 369/112 |

FOREIGN PATENT DOCUMENTS

| | | | |
|---|---|---|---|
| 0228620 | 7/1987 | European Pat. Off. | G11B 7/135 |
| 0402123 | 12/1990 | European Pat. Off. | G11B 7/13 |
| 0539354 | 4/1993 | European Pat. Off. | G11B 7/09 |
| 0554092 | 8/1993 | European Pat. Off. | G11B 7/135 |

OTHER PUBLICATIONS

Ohba, Akitomo, et al. "Reflection Polarizing Holographic Optical Element for Compact Magnetooptical disk heads" In: Applied Optics, vol. 29, No. 34, Dec. 1, 1990, S. 5131.

*Primary Examiner*—Tod R. Swann
*Assistant Examiner*—Kim-Kwok Chu
*Attorney, Agent, or Firm*—Joseph S. Tripoli; Frederick A. Wein; Peter M. Emanuel

[57] ABSTRACT

An optical scanning device having a holographic optical element for receiving a scanning beam which has been influenced by a recording medium. One aspect of the invention is to use an optical spatial filter to obtain the information signals. A further aspect is to image the entire area of the scanning spot on only one detector and to use the complete light component, as a result of which the power component is increased and the requirements for adjustment of a plurality of elements with respect to one another are reduced.

3 Claims, 5 Drawing Sheets

HOLOGRAPHIC ELEMENT DIFFRACTING A REFLECTED LIGHT BEAM ONTO A SINGLE LIGHT SPOT OF A DETECTOR

BACKGROUND

The invention relates to a method and an arrangement for an optical scanning device for scanning information which is stored on a recording medium or for recording information on a recording medium, which optical scanning device contains a radiation source or light source for providing a scanning beam, means for focusing the scanning beam to form a scanning spot, and a detection system having a holographic optical element for receiving the scanning beam which has been influenced by the recording medium. Such scanning devices can be used in CD players and video-disk players or corresponding recording devices.

It is known for holographic optical elements to be used for scanning optical recording media, by means of which holographic optical elements the scanning beam is decomposed into beam elements for tracking and/or for focusing as well as for production of the information signal, cf. EP 0 373 699 B1, EP 0 357 323 B1 and EP 0 305 169 B1. Holographic optical elements contain gratings which deflect the direction of the scanning beam, which is reflected from the recording medium, onto a detection system. The gratings and/or holographic optical elements are used in optical scanning devices in particular for reducing the number of optical elements which are required for implementation of the optical scanning device. As a result of the use of gratings as the beam deflection means or as beam splitting means, the intensity of the scanning beam is reduced in conjunction with beam splitting and higher-order sidelobes are produced in conjunction with the beam deflection by a grating. A plurality of split photodetectors are required for detection, which have to be arranged with high accuracy, and the information signal is formed by addition of signal elements obtained by means of a plurality of detectors, as a result of which the scanning signal which contains the information to be scanned is influenced disadvantageously.

SUMMARY OF THE INVENTION

The object of the invention is to overcome the disadvantages of known methods and devices in terms of obtaining the information signal and in terms of the detection device. Aspects of this object are the resolution of the elements to be scanned and the suppression of interference.

It is an aspect of the invention to use an optical spatial filter to improve the obtaining of information signals in high-resolution scanning devices, such as digital video disk players, for example. Using the optical spatial filter, not only is interference in the information signal eliminated, but the resolution of the elements to be scanned, such as pits in a CD for example, is increased. To this end, the detector in a scanning system is preferably covered by a slot or uses a detector whose dimensions correspond to the slot width, the slot width being matched to the shortest length of the elements to be scanned. This matching comprises the slot width for the shortest pit length being determined for a predetermined numerical aperture using a normalized modulation transfer function as a function of the spatial frequency for the best modulation.

The optical spatial filter then acts in the scanning device in such a manner that the focus point in the plane of the slot or column is the conjugate image of the scanning spot on the recording medium, only the size of the focus point being determined by the enlargement of the imaging optical system, and the structure of the elements to be scanned being reproduced in the slot plane. The structure of the elements to be scanned is reproduced in the slot plane, and their section is selected and filtered using the slot or column respectively. As a result of the fact that the width of the slot is selected such that only a part of the image of the element to be scanned reaches the detector, elements of the image extending beyond this, and/or the remainder of the image, which represents interference, such as intersymbol interference or substrate impurities for example, are masked out, and the resolution of the elements to be scanned is increased. A further aspect is also to image the entire area of the scanning spot on only one detector in scanning systems using holographic optical elements and to use the complete light component, as a result of which the power component is increased and the requirements for adjustment of a plurality of elements with respect to one another are reduced. It should be mentioned as a third aspect that the holographic optical element is intended to have a structure which is as simple as possible. The optical spatial filter is preferably implemented using a holographic optical element which has at least one grating which is one-dimensional in the entire detection beam, a one-dimensional grating being understood to mean a grating whose characteristics are standard or uniform over its entire area. Such a one-dimensional grating is then preferably supplemented in one of its subareas by a further grating, to form a two-dimensional grating.

The one-dimensional grating is used to form a light spot which corresponds completely to the scanning point or recording point and is used for obtaining information signals, so that only one detector is now required which, as a result of a shape which is matched to the light spot, can at the same time be used for cutting out interference light. The matching to the dimensions of the light spot can be achieved by suitable selection of the width of the detector or by covering the detector by a slot. In principle, it is also possible to combine the holographic optical element with a detector which is not matched to the light spot, as a result of which, however, an electronic equalizer is required as a filter for obtaining information signals.

In principle, it is also possible to use the optical spatial filter in scanning devices without holographic optical elements, the thermal stability of the system then being subject to particular requirements, however, in order to meet accuracy requirements which have to be complied with over a wide temperature range.

As a result of the use of only one detector, which is designed integrally without being split, the number of elements which have to be aligned to one another can be reduced in an advantageous manner. Since, nevertheless, adjustment with respect to other detectors, such as of the focusing error detector with respect to the information signal detector, for example, is required, these detectors are preferably arranged at an angle with respect to one another in order to facilitate adjustment by displacement in a plane.

The implementation of the optical spatial filter in conjunction with the said optical holographic element is advantageous in particular because of the thermal problems of known scanning devices.

The use of the optical spatial filter is in principle not limited to the light beam carrying the information of the recording medium.

BRIEF DESCRIPTION OF THE DRAWING(S)

The invention will be explained in more detail in the following text, with reference to drawings, in which: FIG. 1 shows an outline sketch of an arrangement for carrying out the method, FIG. 2 shows an outline sketch of a detector arrangement, FIG. 3 shows an outline sketch of a known scanning system, FIG. 4 shows an outline sketch of a verification arrangement, FIG. 5 shows an oscilloscope display print without an optical spatial filter, FIG. 6 shows an oscilloscope display print with an optical spatial filter, FIG. 7 shows the amplitude/time distribution of the oscilloscope display print without an optical spatial filter, FIG. 8 shows the amplitude/time distribution of the oscilloscope display print with an optical spatial filter.

DESCRIPTION OF THE PREFERRED EMBODIMENT(S)

Figure 1:
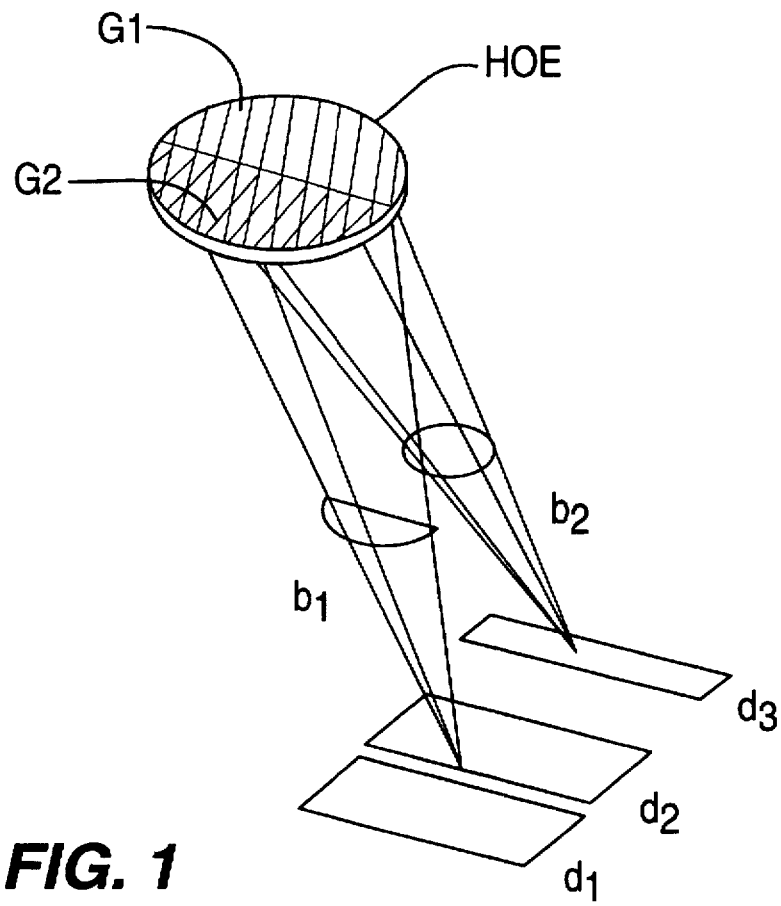

In FIG. 1, the scanning system correspondingly has a holographic optical element HOE which has a first one-dimensional grating G1 in the entire area of the holographic optical element HOE. A second grating G2 is provided only in a subarea of the holographic optical element HOE, is preferably likewise provided as a second one-dimensional grating G2 and forms a two-dimensional grating, comprising the grating G1 and the grating G2, in this area with the one-dimensional grating G1 which extends over the entire holographic optical element HOE. The gratings G1 and G2 are preferably phase gratings, but can also be formed by amplitude gratings. The one-dimensional grating G1 results in the formation of a beam b2 which completely reproduces the scanning point, represents the information signal and is detected using only a single detector d3. The light beam which emerges from one overall element is represented in FIG. 1 by a circle in the beam path of the beam b2. Interference originating from sidelobes or from adjacent scanning elements is cut out by matching the width of the photodetector d3 to the light spot diameter formed by the beam b2 and to the elements to be scanned. This principle is also called a spatial filter. As a result of the particular use of a spatial filter for providing an information signal, a light spot which completely represents the scanning location is formed from the beam b2 despite the diffraction and splitting losses which occur as disadvantages originating from gratings, which light spot can advantageously be used to cut out interference from side effects by matching the detector d3 to the dimensions of the light spot and to the elements to be scanned. No special adjustment of the detector is required since only a single detector d3 can be used.

Figure 2:
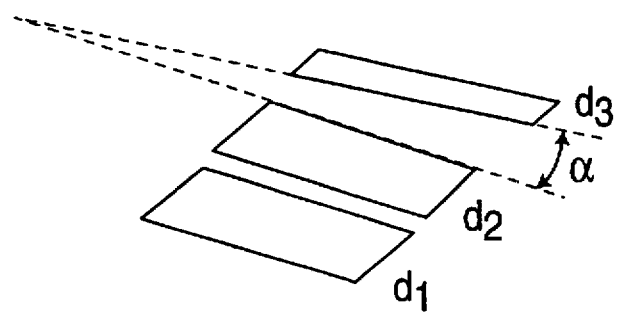
Figure 3:
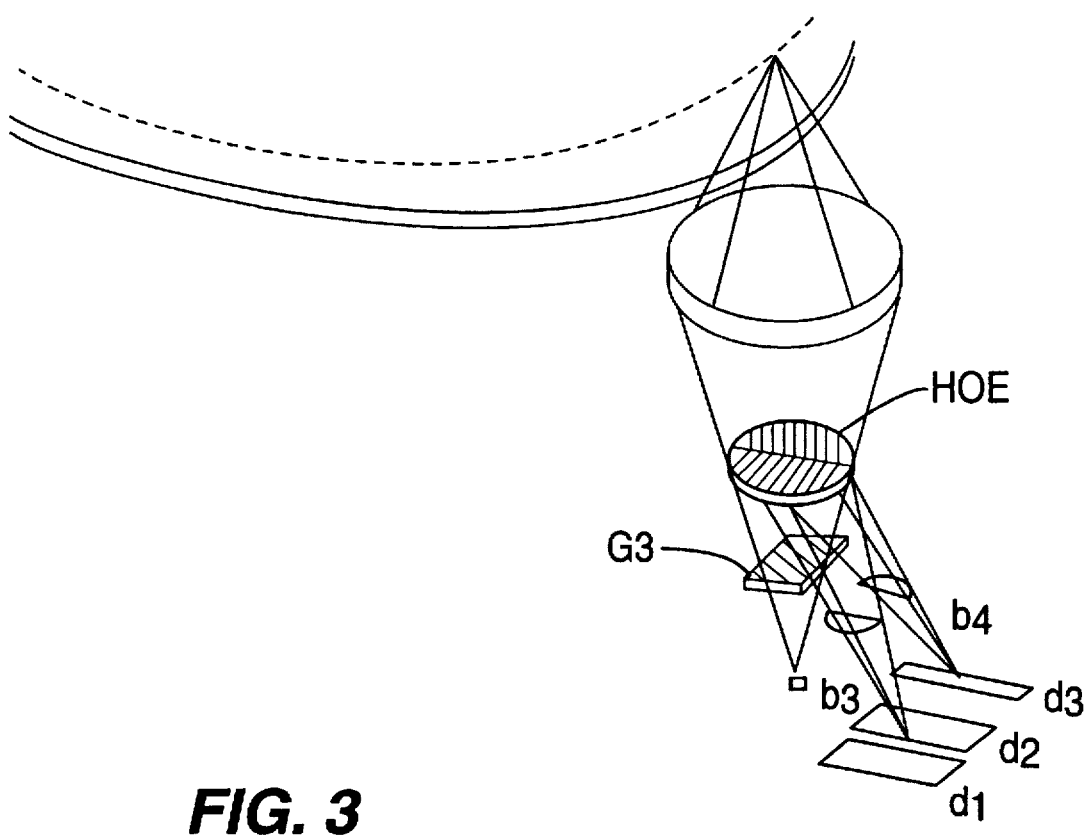

In order to produce a focusing error signal, one half of the holographic optical element HOE has a second grating G2 which forms a two-dimensional grating in this area with the first one-dimensional grating G1. The light component which emerges from this half of the holographic optical element HOE, or the beam b2, in consequence also represents only half the scanning beam. This is indicated in FIG. 1 by a semicircle in the beam path bi, which is directed at the focusing error detector, which comprises two detectors d1 and d2. The focusing error detector and the information signal detector are preferably arranged in a plane. In order, nevertheless, to make it possible to match the width of the detector d3 in an optimum manner to the light spot formed by the beam b2, for obtaining information signals, the detector d2 is arranged at an angle α to the focusing error signal detector or at a distance at an angle α to the centre line formed by the detectors d1 and d2 between them, cf. FIG. 2. This makes adjustment possible in an advantageous manner in a plane, although a light spot size change is determined in particular by the distance to the holographic optical element HOE. The idea of the invention becomes particularly clear if, in contrast to this, one considers an arrangement as illustrated in FIG. 3. FIG. 3 contains a holographic optical element HOE which has a one-dimensional grating in one half in each case, this grating having a grating structure, however, in accordance with the known prior art, which differs either in its direction or shape with respect to that of the other half. In consequence, two detection beams b3 and b4 are produced which, however, each represent only a half of the scanning beam. This is indicated in FIG. 3 by the semicircles in the detection beams b3 and b4. In order to be able to provide a focusing error signal in addition to the information signal, as well, a grating G3 is provided in the detection beam b3, which grating G3 forms a two-dimensional grating with the grating of the holographic optical element HOE, a light spot which represents focusing errors being formed in an analogous manner to FIG. 1 with the two-dimensional grating. Focusing error signals are then provided by means of the detectors d1 and d2, corresponding to the known double-Foucault method. As a result of the fact that, in contrast to the proposed solution, no one-dimensional grating G1 is provided extending over the entire area of the holographic optical element HOE, a detection beam b4 which is formed only with one half of the holographic optical element HOE can represent only one half of the scanning beam, so that the scanning point is not completely reproduced and a reduced light power can be seen. Furthermore, a light spot which originates from a circular light distribution has a smaller number of sidelobe maxima than those which originate from a semicircular light distribution.

Figure 4:
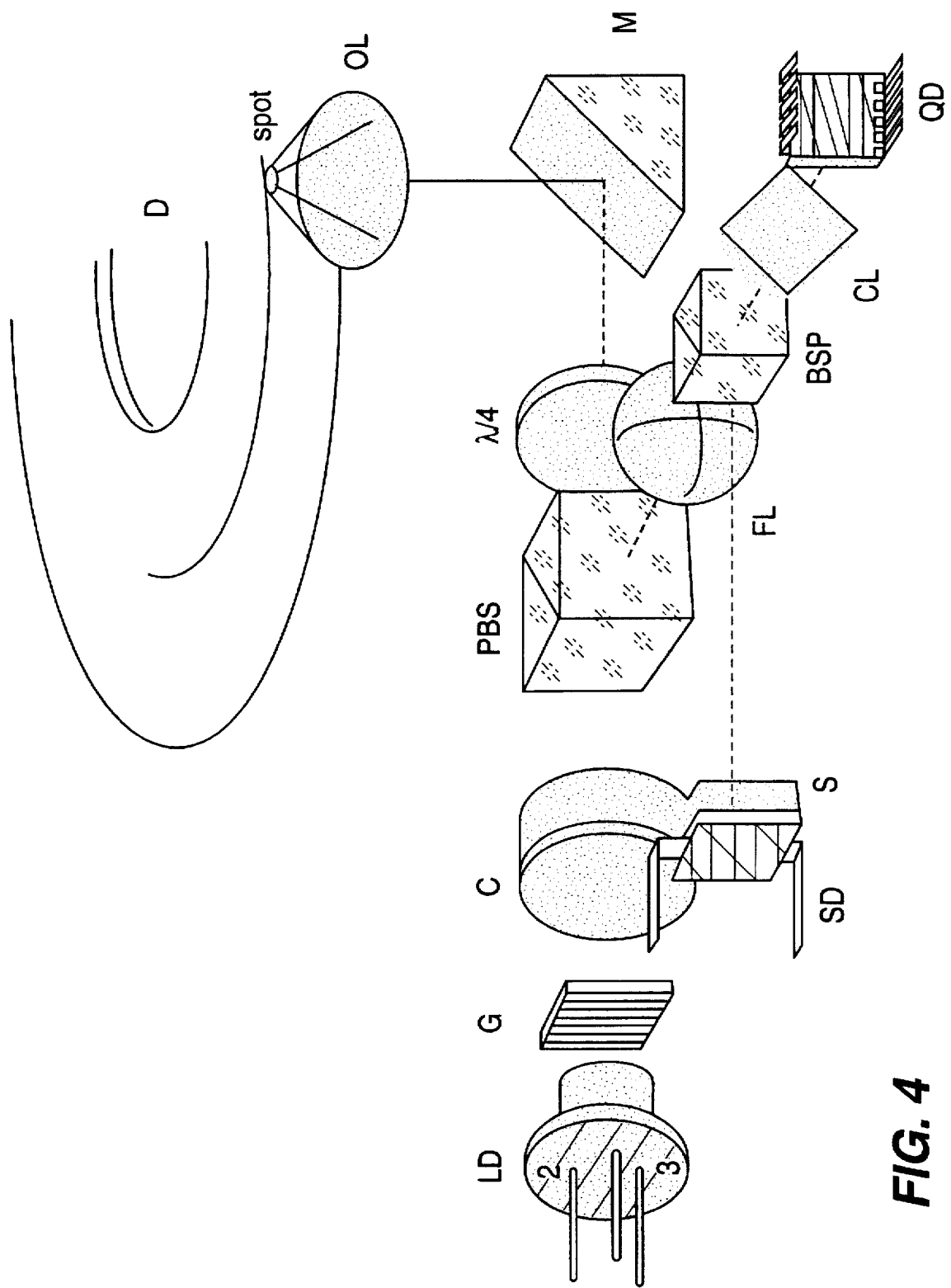
Figure 5:
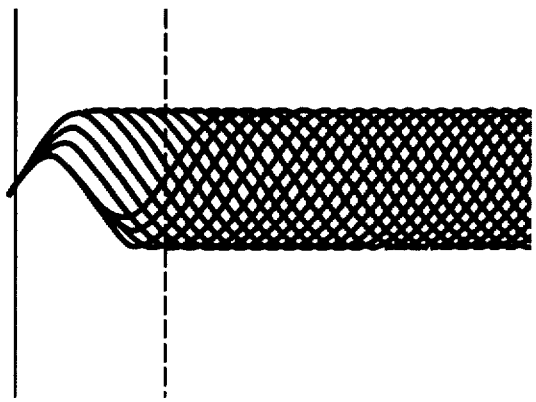
Figure 6:
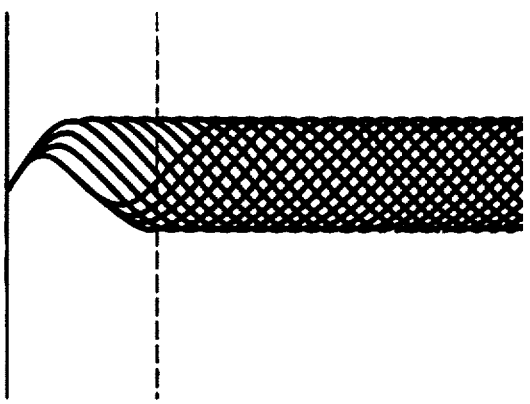
Figure 7:
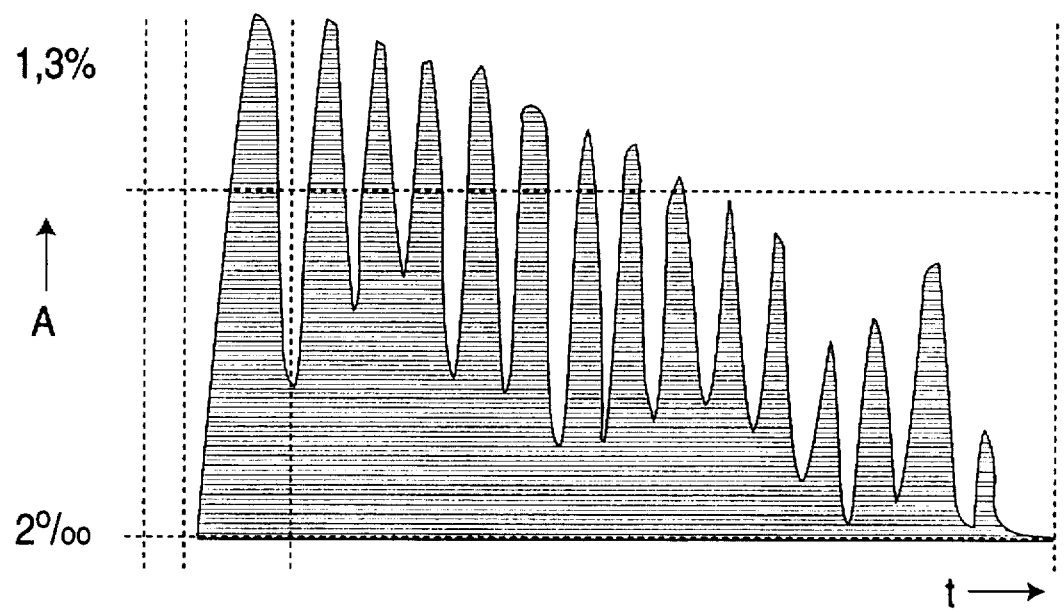
Figure 8:
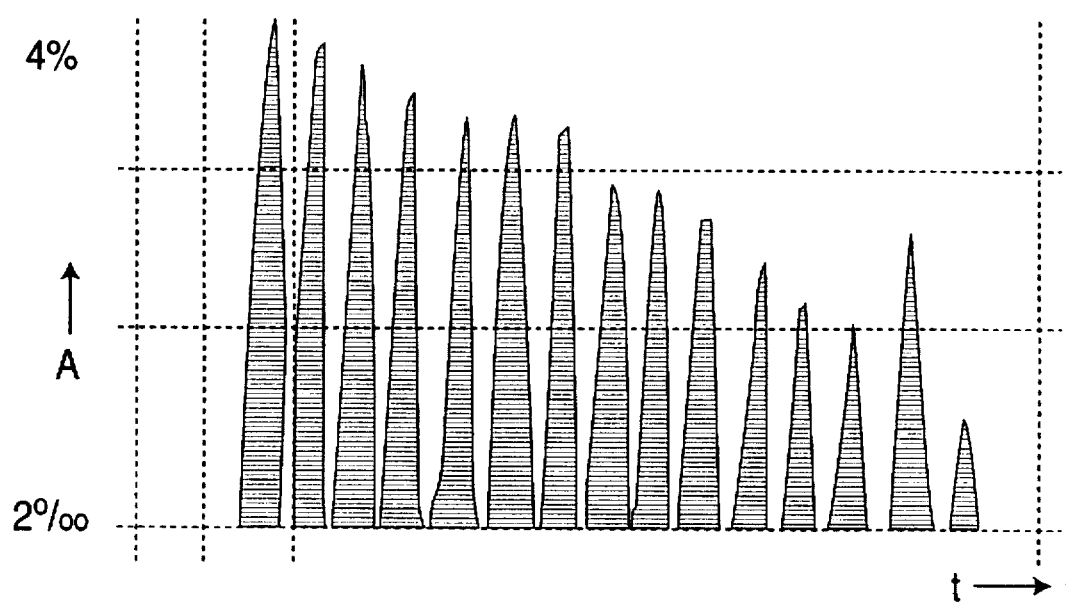

A verification arrangement, which is indicated in FIG. 4, for implementation of the optical spatial filter makes it clear that the use of the optical spatial filter is not limited to the application in conjunction with a scanning device using a holographic optical element. The arrangement which is illustrated in FIG. 4 can in principle also be used for optical scanning of recording media having a high storage density. However, the disadvantages of this arrangement are its thermal instability, so that preference would have to be given to the scanning device using a holographic optical element. Nevertheless, the verification of the surprising effect originating from the use of an optical spatial filter has been obtained with the arrangement indicated in FIG. 4.

According to FIG. 4, the light from the laser LD, which light is reflected from the disk D, is passed via the polarization beam splitter PBS to a focusing lens F1 and is split into two parts using a beam splitter BSP. A first part passes through a cylindrical lens CL and is focused on a quadrant detector QD, by means of which the servo signals are obtained. The second part is deflected on a single detector SD, which is covered by a slit or slot S in order to form a spatial filter. The same arrangement according to FIG. 4 is used without the slit or slot S in order to compare the characteristics of the scanning device with and without the spatial filter. The scanning or information signal is provided from the detector SD, and the arrangement according to FIG. 4 has the further elements of a scanning device, such as the gratings G, collimator C, quarter-wave plate λ/4, deflection mirror M and objective lens OL.

The split or slot S is arranged at right angles to the information track on the disk D and has a width which is matched to the shortest pit length. A slot width of 15 μm is preferably used in the case of a shortest pit length of 0.48 μm. The optimum slot width for a predetermined numerical aperture of the object lens OL and of the focusing lens FL is determined using a normalized modulation transfer function as a function of the spatial frequency for the best modulation.

The advantageous and surprising results of the use of an optical spatial filter in a deflection device are shown in FIGS. 5 to 8. It can be seen from the comparison of FIG. 5 and FIG. 6 that the eyes of the signal produced with the optical spatial filter are further open. This means that the signals at a higher frequency are raised more strongly with the spatial filter. The illustration of the amplitudes A with respect to time t according to FIG. 7 and FIG. 8 indicates the pulse-width distribution. While the unfiltered eye signal exhibits only incompletely separated pulses, which leads to an increased error rate and to faulty decoding, the filtered eye signal has sharp, separate spikes, or so-called peaks. The standard deviation is reduced roughly by half, and the amplitude is increased by virtually 3%. This means that, with the optical spatial filter or the slit or slot S in front of the detector SD, not only are interference signals and interference components masked out, but the scanning signal is considerably improved. In consequence, the optical spatial filter can be used particularly advantageously in optical scanning devices, such as digital video disk players for example, which scan recording media having a high storage density. Since the recording of information also requires a high signal quality, the area of application is not limited to players, and includes recorders just as well.

We claim:

1. Arrangement for an optical scanning device for scanning information which is stored on a recording medium or for recording information on a recording medium, comprising:

a radiation source or a light source for providing a scanning beam, means for focusing the scanning beam to form a scanning spot, a detection system having a holographic optical element for receiving the scanning beam which has been influenced by the recording medium, a one dimensional grating which extends over the entire area of the holographic optical element is provided in the beam path in front of the detection system, the holographic optical element having a first one-dimensional grating which extends over the entire area of the holographic optical element and having a second one-dimensional grating which extends over half the holographic optical element, the first one-dimensional grating obtaining a light spot which represents the information of the recording medium, the second one-dimensional grating forming a two-dimensional grating with the first one-dimensional grating the two-dimensional grating forming a light spot which represents a focusing error.

2. Arrangement of a scanning device for scanning information which is stored on a recording medium or for recording information on a recording medium, which scanning device comprising:

a radiation source for providing a scanning beam, means for focusing the scanning beam to form a scanning spot, a detection system for receiving the scanning beam which has been influenced by the recording medium, and an optical spatial filter formed by a detector whose width is matched to the shortest length of elements to be scanned, as a function of modulation.

3. Arrangement according to claim 2, wherein the width of the detector is formed by a slot which is arranged in front of said detector.

* * * * *